United States Patent
Wagle et al.

(10) Patent No.: US 9,886,313 B2
(45) Date of Patent: Feb. 6, 2018

(54) NUMA-AWARE MEMORY ALLOCATION

(71) Applicant: SAP SE, Walldorf (DE)

(72) Inventors: Mehul Wagle, Pune (IN); Daniel Booss, Wiesloch (DE); Ivan Schreter, Malsch (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/816,480

(22) Filed: Aug. 3, 2015

(65) Prior Publication Data

US 2016/0371194 A1 Dec. 22, 2016

(51) Int. Cl.
*G06F 9/50* (2006.01)

(52) U.S. Cl.
CPC .................. *G06F 9/5016* (2013.01)

(58) Field of Classification Search
CPC ..... G06F 12/109; G06F 12/10; G06F 12/1027
See application file for complete search history.

(56) References Cited

U.S. PATENT DOCUMENTS

| | | | |
|---|---|---|---|
| 6,182,089 B1* | 1/2001 | Ganapathy | G06F 12/023 |
| 2007/0118712 A1* | 5/2007 | van Riel | G06F 12/023 |
| | | | 711/170 |
| 2011/0125974 A1* | 5/2011 | Anderson | G06F 12/084 |
| | | | 711/153 |
| 2013/0232315 A1* | 9/2013 | Tian | G06F 12/0284 |
| | | | 711/170 |
| 2015/0248361 A1* | 9/2015 | van Riel | G06F 13/1657 |
| | | | 711/148 |

OTHER PUBLICATIONS

Andreas Kleen, "A NUMA API for LIMUX", Technical Linux Whitepaper, Novell, Apr. 2005.*
Blagodurov, Sergey et al., "A Case for NUMA-aware Contention Management on Multicore Systems", USENIX11, 2011, 15pgs.
Libnuma—3rd party library for "NUMA Policy Control", (n.d.) , retrieved on Jul. 8, 2015, retrieved from http://linux.die.net/man/3/numa, copyright 2008, 11pgs.

* cited by examiner

*Primary Examiner* — Ryan Bertram
*Assistant Examiner* — Trang K Ta
(74) *Attorney, Agent, or Firm* — Buckley, Maschoff & Talwalkar LLC

(57) ABSTRACT

A system includes a first node including a first processor and a first memory, and a second node including a second processor and a second memory. A worker thread of the first processor calls an allocation API to allocate a portion of the first memory, and calls a first allocator of a first memory manager associated with the first node to allocate a specified size of the first memory. The first memory manager calls an operating system function to reserve a memory segment of the specified size, sets a first Non-Uniform Memory Access policy of the first node to preferred, binds the reserved memory segment to the first node, adds the memory segment to a global freelist, and returns an address pointer of the reserved memory segment to the worker thread.

12 Claims, 8 Drawing Sheets

NUMA-AWARE MEMORY ALLOCATION

CROSS-REFERENCE TO RELATED APPLICATIONS

The present application claims priority to Indian Provisional Application No. 3087/CHE/2015, filed Jun. 19, 2015 and entitled "NUMA-AWARE MEMORY ALLOCATION".

BACKGROUND

In a traditional multi-processor computing system, each processor (or Central Processing Unit (CPU)) shares a single memory controller. The memory controller controls all the available Dynamic Random Access Memory (DRAM) (i.e., Dual Inline Memory Modules (DIMMs)) of the computing system. All CPUs have equal access to the memory controller and, thus, to the DRAM.

Communication between the CPUs also goes through the memory controller, which can present a bottleneck if multiple CPUs attempt to access the DRAM simultaneously. The number of DIMMs that can be managed by a single controller is limited, thereby limiting the memory capacity supported by a computing system. In addition, the latency to access memory through the single memory controller is relatively high. This architecture therefore does not scale very well as the number of CPUs in a computing system increases.

Non-Uniform Memory Access (NUMA) describes an architecture in which the CPUs of a computing system are able to access some memory locations faster than other memory locations, and in which the faster memory locations are not the same for each CPU. FIG. 1 illustrates hardware of exemplary NUMA system 110.

System 110 includes nodes 112, 114, 116 and 118. Each node includes four CPU cores, a memory controller and memory (e.g., DRAM). Nodes 112, 114, 116 and 118 are interconnected by interconnects 122, 124, 126, 128 and 130, which are responsible for hosting node-to-node inter-communication traffic (e.g., remote memory access).

A node may include one or more CPUs. Each CPU of a particular node has symmetric or equivalent access to the memory of the particular node (e.g., one or more levels of local hardware caches), and is able to access this memory faster than the CPU can access the memory of another node. Specifically, remote memory latency and interconnect contention contribute to the slower access of remotely-located memory. It is desirable to avoid remote memory accesses and resource contention.

DESCRIPTION

The following description is provided to enable any person in the art to make and use the described embodiments. Various modifications, however, will remain readily apparent to those in the art.

Figure 2:
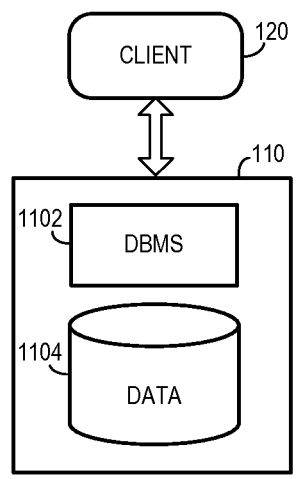
FIG. 2 is a block diagram of a database architecture according to some embodiments.

FIG. 2 is a block diagram of a database architecture according to some embodiments. FIG. 2 represents a logical architecture for describing systems according to some embodiments, and actual implementations may include more or different components arranged in other manners. Embodiments are not limited to use in database architectures, and may be implemented in any computing system including more than one processor and memory.

Database system 110 may comprise a computing system including multiple nodes, with each node including at least one CPU, a memory controller and a memory. Database system 110 may comprise any query-responsive data source or sources that are or become known, including but not limited to a structured-query language (SQL) relational database management system. Database system 110 may comprise a relational database, a multi-dimensional database, an eXtendable Markup Language (XML) document, or any other data storage system storing structured and/or unstructured data. Data 1104 of database 110 may be distributed among several relational databases, multi-dimensional databases, and/or other data sources. Embodiments are not limited to any number or types of data sources. For example, database 110 may comprise one or more OnLine Analytical Processing (OLAP) databases (i.e., cubes), spreadsheets, text documents, presentations, etc.

Database 110 may implement an "in-memory" database, in which volatile (e.g., non-disk-based) storage (e.g., Random Access Memory) is used both for cache memory and for storing the full database during operation, and persistent storage (e.g., one or more fixed disks) is used for offline persistency and maintenance of database snapshots. Alternatively, volatile storage may be used as cache memory for storing recently-used data, while persistent storage stores the full database.

Data 1104 of database 110 may comprise one or more of conventional tabular data, row-based data stored in row format, column-based data stored in columnar format, and object-based data. Database 110 may also or alternatively support multi-tenancy by providing multiple logical database systems which are programmatically isolated from one another. Moreover, data 1104 may be indexed and/or selectively replicated in an index to allow fast searching and retrieval thereof.

Database management system 1102 serves requests to retrieve and/or modify data 1104, and also performs administrative and management functions for database 110. Such functions may include snapshot and backup management, indexing, optimization, garbage collection, and/or any other database functions that are or become known.

Database client 120 may comprise one or more computing devices executing program code of a software application for presenting user interfaces to allow interaction with database system 110. For example, a user may manipulate such user interfaces to request particular data (e.g., for populating a spreadsheet, a graph, etc.). In response, client 120 executes program code of a software application to generate a query (e.g., a structured query language (SQL) query) identifying the requested data, and to transmit the query to database management system 1102.

Figure 3:
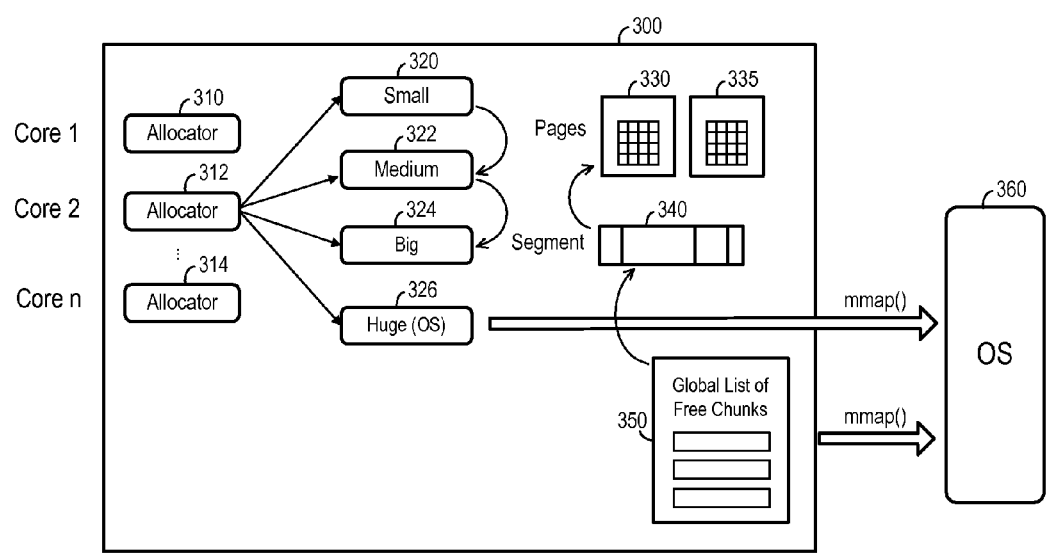
FIG. 3 is a functional block diagram of a memory manager.

Operation of database management system 1102 requires execution of CPU threads and allocation of memory for specific tasks. FIG. 3 illustrates the allocation of memory in "NUMA-oblivious" memory manager 300. Memory manager 300 designates one dedicated "Allocator" object (310-314) per logical core (or processor) to manage allocation requests of worker threads executing on that core. Accordingly, in a case that a worker thread needs to allocate a few chunks of memory (e.g., to insert data into a table), the memory manager 300 services the request by forwarding the request to the "Allocator" designated to the thread's execution core. An allocator may borrow memory from the cached memory in an allocator of another CPU (or even NUMA Node) in case it faces an Out-of-Memory (OOM) situation. The overall system memory is therefore partitioned via logical CPUs, which helps optimize CPU overheads by avoiding expensive synchronization mechanisms which would be required for multi-threaded allocations.

Each allocator component includes four sub-allocators, one of which is called depending on the size of the requested memory. Small allocator 320 deals with sizes <=4 KB, medium allocator 322 deals with sizes <=32 KB, while big allocator 324 handles sizes up to 256 MB. Requests for other sizes are forwarded directly to operating system (OS) 360 by huge allocator 326 via mmap system calls.

Big allocator 324 handles large chunks of virtual memory (8 MB-256 MB) by allocating them indirectly via an 'mmap' system call. Small allocator 320 and medium allocator 322 operate on fixed size pages of 64 KB, which are eventually allocated inside chunks carved by big allocator 324. The memory chunks allocated by big allocator 324 originate from global free list of chunks 350. Therefore, when an allocator de-allocates space from a chunk and the chunk becomes free, the chunk is returned to the global freelist. The chunks are not returned by freelist to OS 360 and instead are retained within the process's address space, which helps reduce expensive kernel space calls and the associated page faults.

The design of FIG. 3 does not necessarily guarantee that the allocated memory will live on the NUMA node of the executing thread. Most operating systems use a policy of "first touch", which means that a newly-allocated memory page is placed local to the thread that uses (touches) it for the first time. Since the 'mmap' system call is used to reserve large segments from OS 360, a memory page is usually committed to the core of "first touch".

Also, with multiple per-CPU allocators working on the memory (DRAM) of a single NUMA node, memory fragmentation or remote access penalties are possible. A thread might run out-of-memory with a particular CPU's allocator and switch to memory reserves cached with another allocator, possibly on a remote NUMA node.

In a multi-threaded environment with a high frequency of context switches among allocating threads, the above factors add potential uncertainty in the memory distribution of application data (including workload tables) across a NUMA topology.

Figure 4:
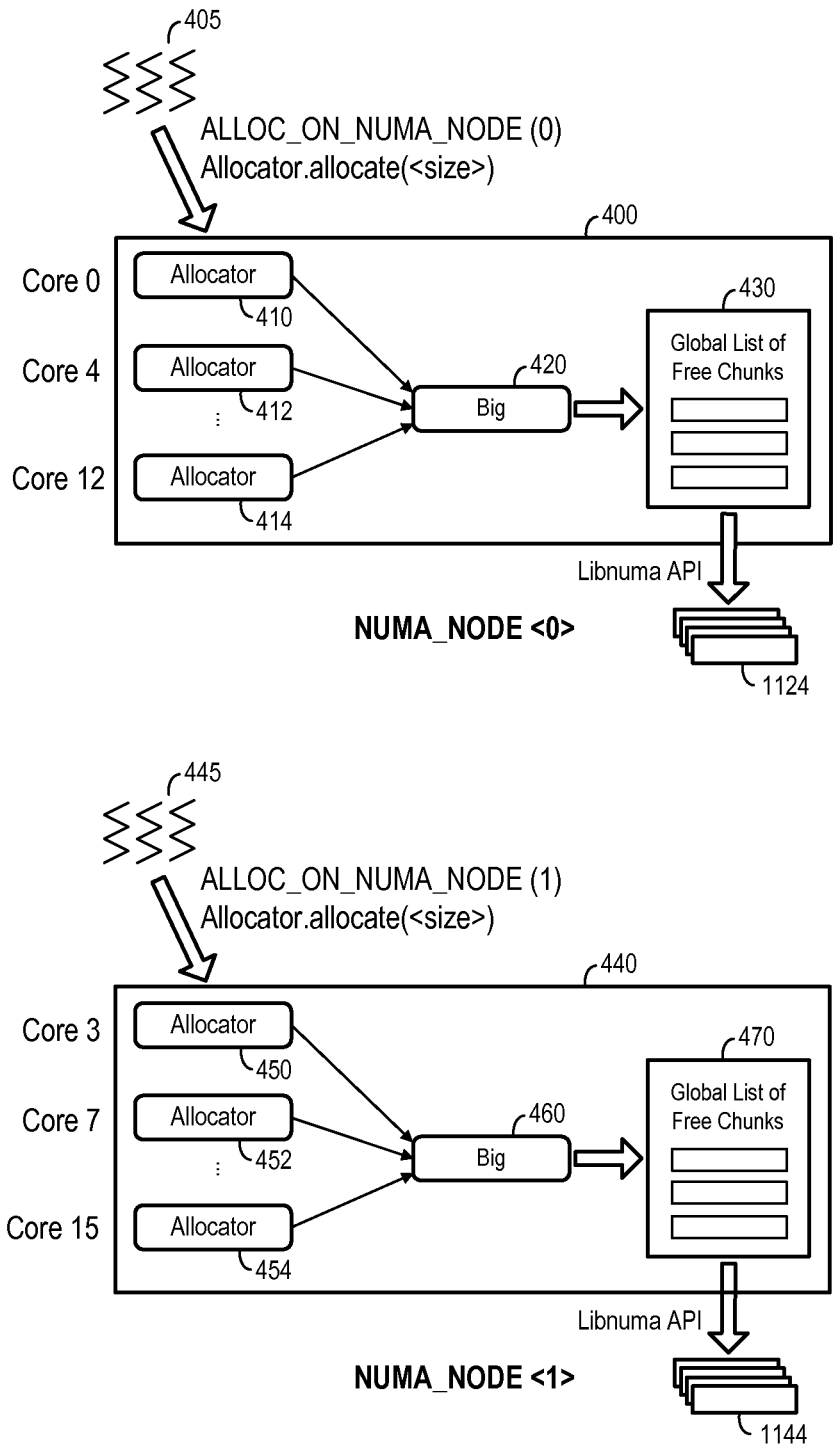
FIG. 4 comprises functional block diagrams of memory managers according to some embodiments.

The libnuma package is a 3rd party shared user-space library for fine-grained NUMA policy control which may be called from user programs. The package is installed with 'libnuma-devel' and 'numactl-devel' packages on SUSE and RHEL LINUX distributions, respectively. The NUMA API currently supports four different policy flavors:
default: Allocate on the local node (the node the thread is running on)
bind: Allocate on a specific set of nodes
interleave: Interleave memory allocations on a set of nodes
preferred: Try to allocate on a node first Some embodiments use customized memory allocators for heap memory management. Instead of having big memory allocator 326 use mmap system calls to reserve virtual memory after searching the global free list as shown in FIG. 3, NUMA policy is set for virtual memory addresses using APIs from the 'libnuma' library. FIG. 4 illustrates use of a new API "ALLOC_ON_NUMA_NODE (<N>)" which wraps these libnuma APIs in order to set NUMA policy for virtual memory addresses.

Figure 1:
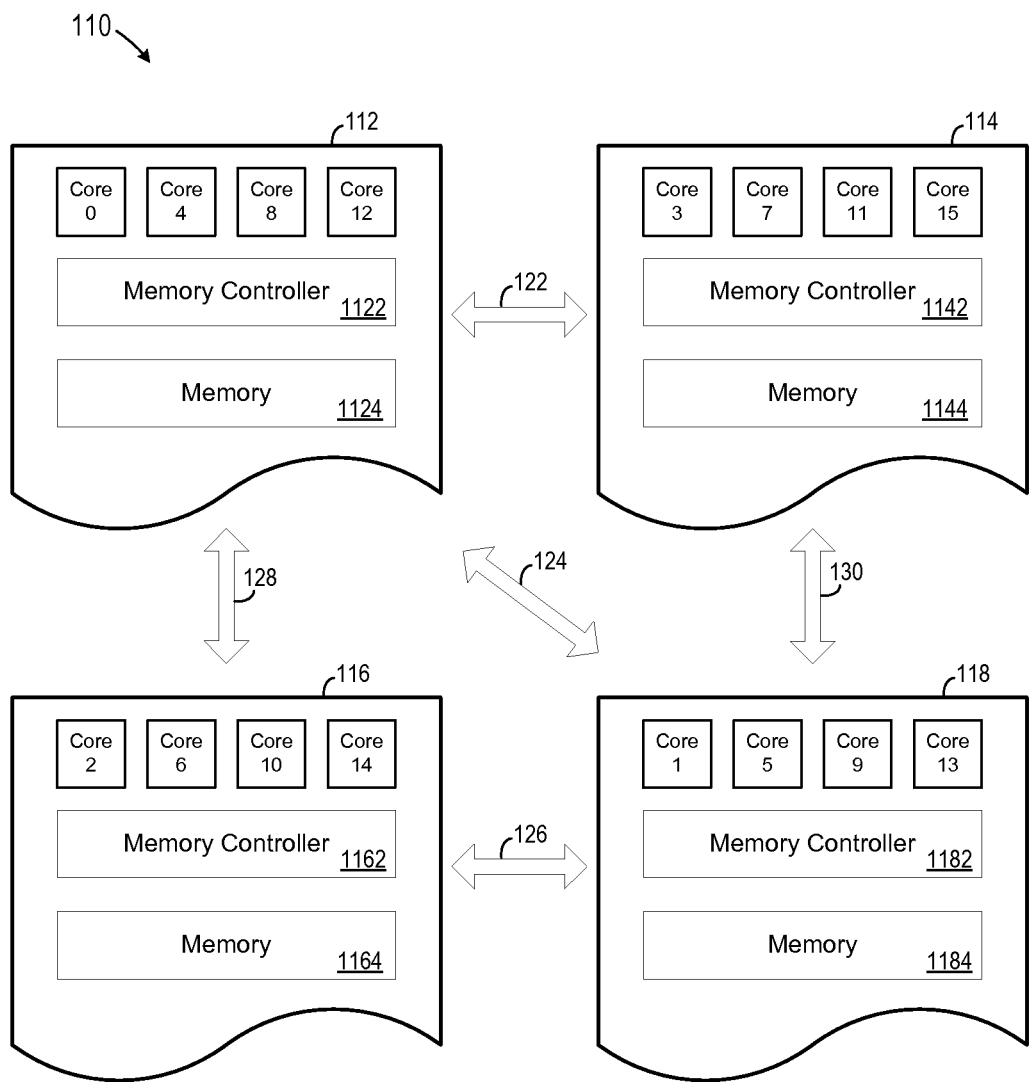
FIG. 1 is a block diagram illustrating nodes of a computing device.

As shown in FIG. 4, worker thread 405 calls "ALLOC_ON_NUMA_NODE (<0>)" to allocate memory addresses of memory 1124 (e.g., DRAM DIMMs) for use by cores 0, 4, 8 and 12. With reference to FIG. 1, memory 1124 and cores 0, 4, 8 and 12 are all located on the same node (i.e., node 0). The call is an entry point to memory manager 400, which switches the context of the thread to memory manager 400 and provides an entry to the allocator designated for the thread's particular CPU. As will be described in detail with respect to FIGS. 5 and 6, the allocator calls, directly or indirectly, big sub-allocator 420 and the libnuma APIs are then called from global list of free chucks 430. Memory manager 440 of node 1 operates similarly.

Figure 5A:
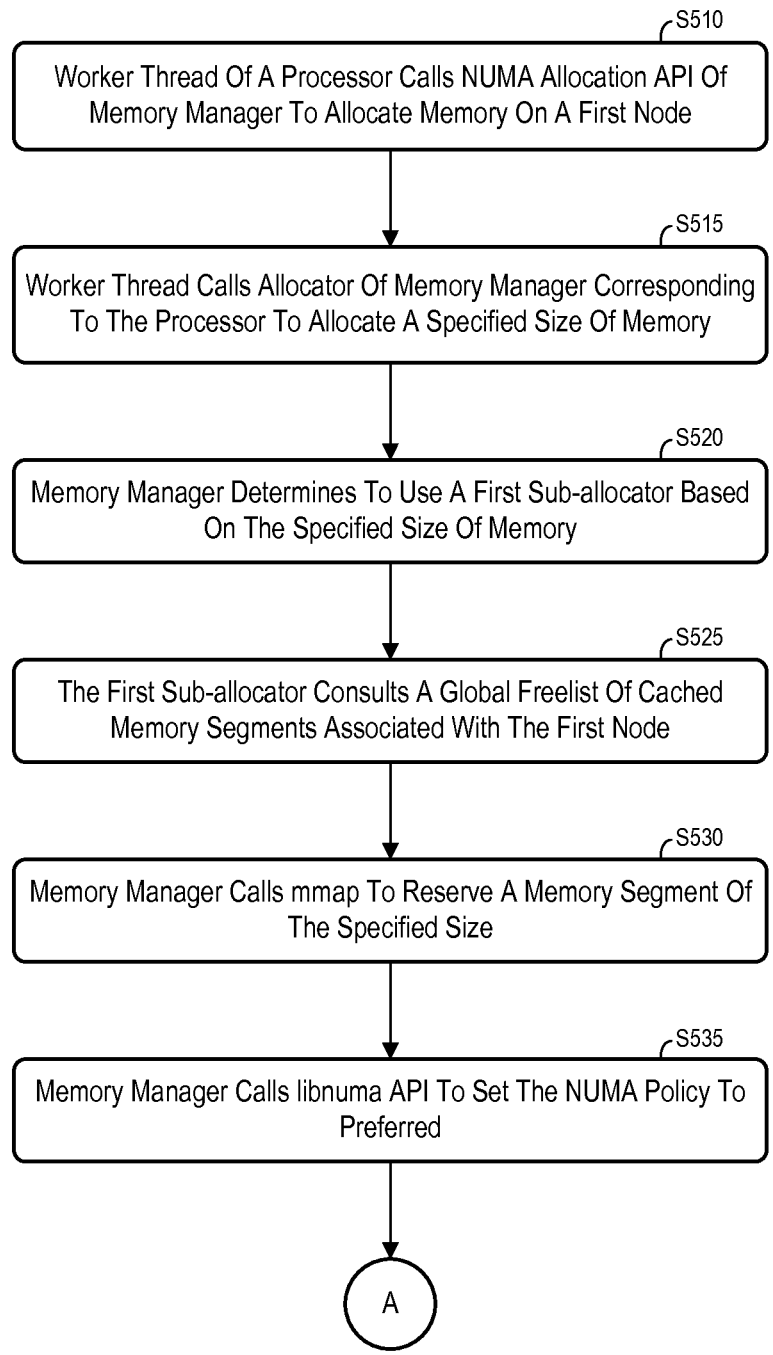
FIGS. 5A and 5B comprise a flow diagram according to some embodiments.
Figure 5B:
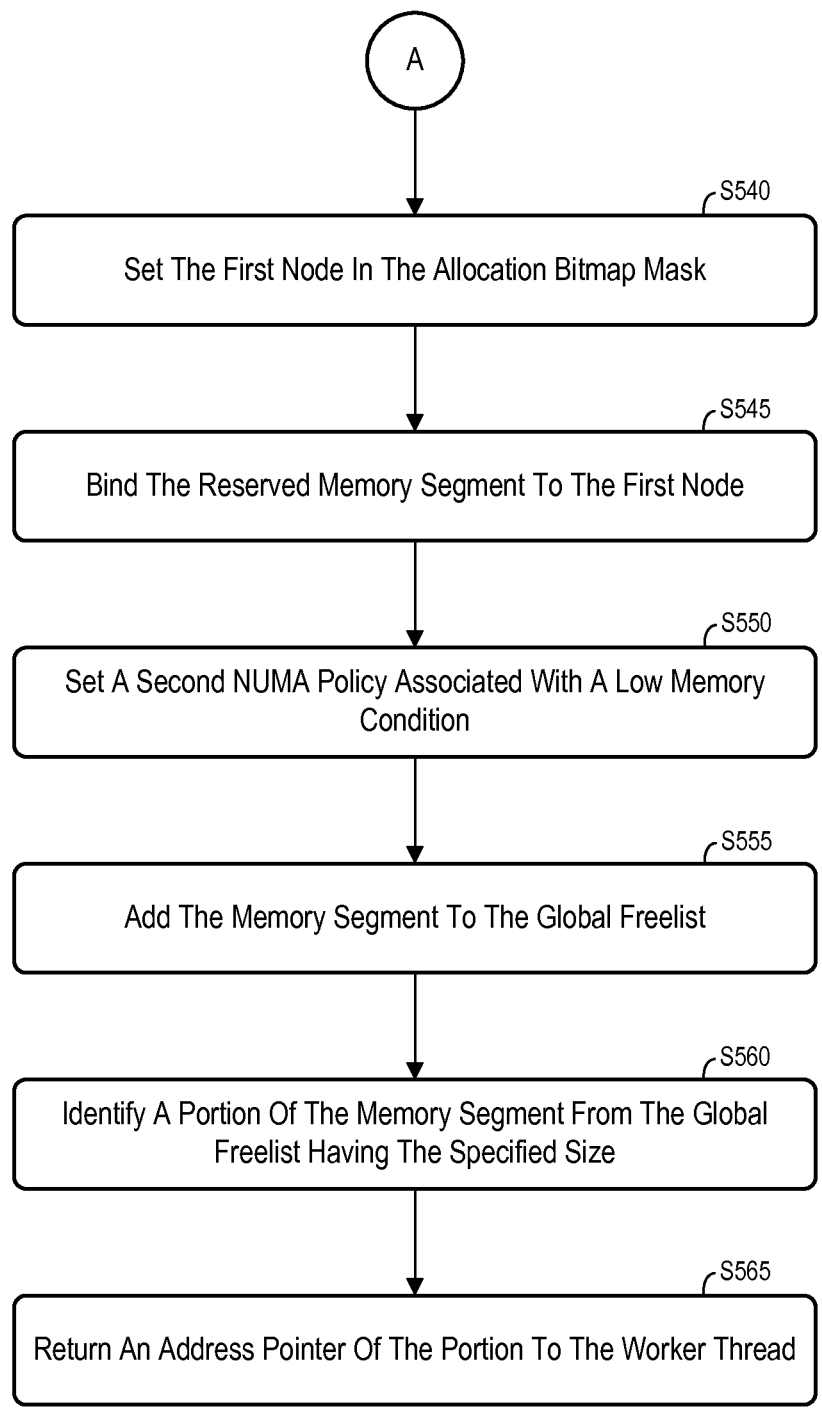
Figure 6:
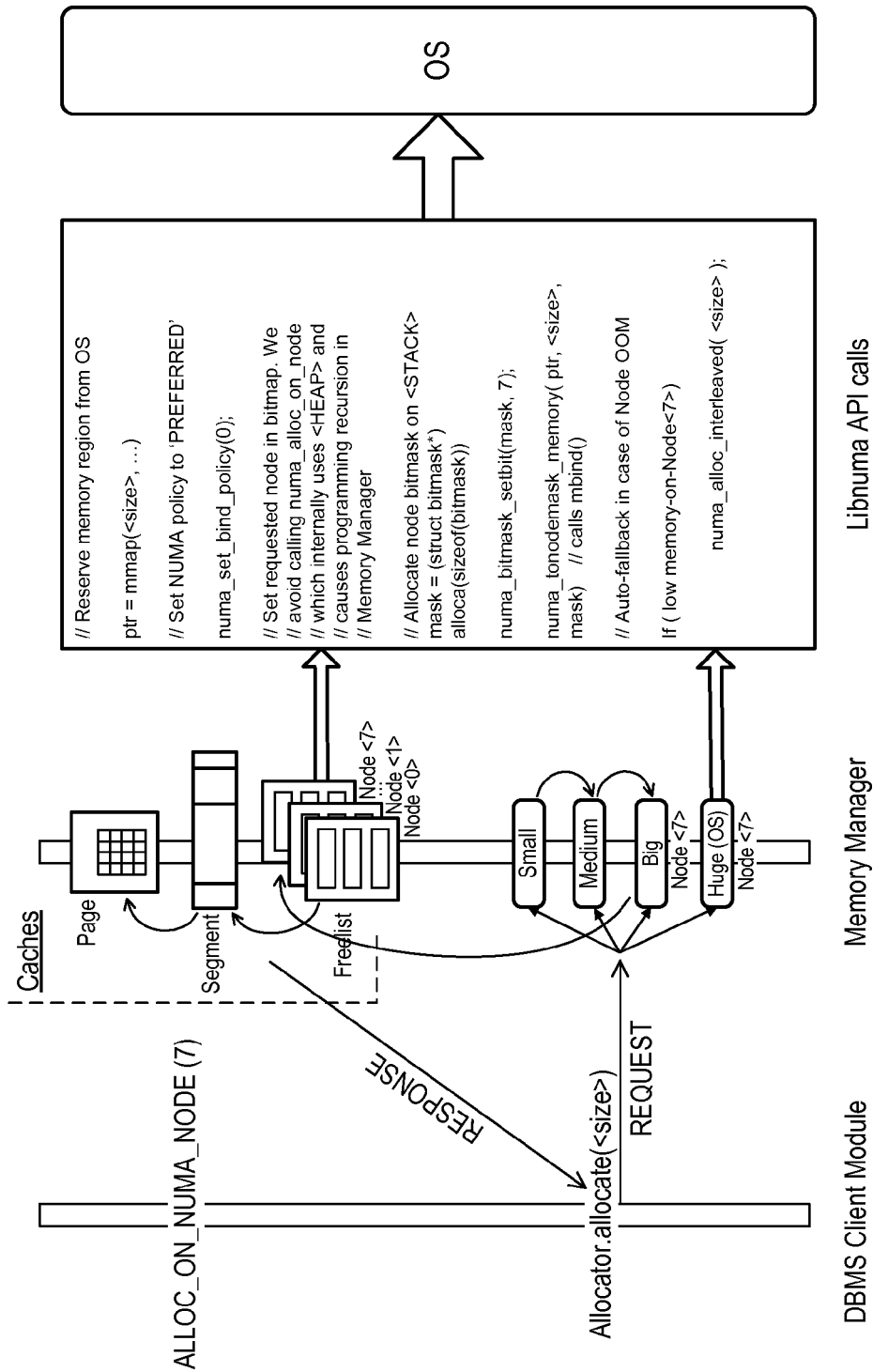
FIG. 6 is a sequence diagram illustrating node-specific memory allocation according to some embodiments.

FIG. 5 is a flow diagram of process steps and FIG. 6 is a detailed illustration according to some embodiments. Initially, at S510, a worker thread of a processor calls a NUMA Allocation API of a memory manager to allocate memory of a first node. The example provided will assume that an allocation of memory located on node 7 is desired. Accordingly, in one example of S510, a worker thread of a database system client module calls ALLOC_ON_NUMA_NODE (7).

Next, at S515, the worker thread calls an allocator of the memory manager to allocate a specified size of memory. The called allocator is an allocator corresponding to the processor of the worker thread. As shown in FIG. 6, this call may consist of Allocator.allocate<size>.

The call of S515 serves as an entry into the memory manager. At S520, the memory manager determines to use a first sub-allocator based on the specified memory size. As shown in FIG. 6, the Big sub-allocator is used if the specified size conforms to the sizes associated with either the Small, Medium or Big sub-allocators. This is because memory sizes associated with the Small and Medium sub-allocators are allocated based on the below-described actions of the Big allocator.

In this regard, the determined first sub-allocator indirectly consults a global freelist of cached memory segments associated with the first node at S525. More specifically, the Small sub-allocator consults the Medium sub-allocator (if memory page not cached with Small) and the Medium sub-allocator consults the Big (if memory page not cached with Medium) and finally the Big sub-allocator similarly consults the global freelist. By consulting the global freelist only when necessary, a need for expensive operating system calls and kernel context switches is reduced.

At S530, the memory manager calls mmap to reserve a memory segment of the specified size (e.g., ptr=mmap (<size>, . . . )). The memory manager then makes libnuma API calls for NUMA-aware allocations.

First, at S535, the memory manager sets the NUMA policy to 'preferred' by calling a libnuma API (e.g., numa_set_bind_policy(0)). Next, at S540, the allocation bit mask is set to the first node (e.g., numa_bitmask_setbit (mask, 7)). The reserved memory is bound to the first node at S545 using, e.g., the numa_tonodemask_memory(ptr, <size>, mask) API call. S550 then includes setting a second NUMA policy of the first node (i.e., node 7) to act as a fallback policy in a low memory or out-of-memory condition. In the present example, the second NUMA policy is the interleaved policy but embodiments are not limited thereto.

According to the above implementation, an Out-Of-Memory (OOM) on Node condition is likely quite rare, because the set NUMA policy of "preferred" (as opposed to "bind") causes the operating system to transparently use auto-fallback in the event of low memory on a requested node.

The allocated memory segment is added to the global freelist at S555. A portion of the memory segment having the specified size is identified from the freelist at S560. The portion may have a size corresponding to the Small, Medium or Big sub-allocators. The address pointer of the identified portion is then returned to the worker thread at S565 (e.g., RESPONSE of FIG. 6).

In prior implementations, using libnuma APIs in a process-managed heap memory model that uses function interposition of UNIX C Library APIs (e.g. malloc, calloc, new) potentially results in undesirable problems like programming re-entrancy (i.e. stack overflow). Some embodiments of the foregoing address this issue by reworking certain NUMA API implementations to avoid usage of STACK-based allocations (e.g., 'numa_alloc_on_node') for the UNIX C library-allocated data structures, instead manually allocating a node bitmask on <STACK>, setting the target node bit in bitmask, and using 'numa_tonodemask_memory' to bind memory to the bitmask.

In order to handle low memory or out-of-memory situations on a target node at the node binding stage ('numa_alloc_*'), some embodiments plug in a fallback mechanism allowing the memory manager to handle allocation errors transparently. According to one strategy of some embodiments, the "interleaved" policy is employed if a node becomes low on memory. In another mutually-compatible strategy, and in order to deal with low memory availability at actual commit time (or "page touch") by the Linux kernel, the "preferred" node binding mechanism is used in order to spill over "non-fitting" allocations to other nodes.

A fallback alternative according to some embodiments is to switch to a "Near Node" policy in a low memory situation. The "Near Node" alternative may be implemented with both node binding and commit of reserved memory. This may include reading and deriving the NUMA hardware topology (i.e., the inter-node distances) from system tables such as the System Locality Information Table (SLIT).

To implement the concept of NUMA-aware memory management, the global freelist, which was NUMA-oblivious in prior systems, is "NUMA-sensitized". To do so, the "process-global" DBMS cache shared by multiple threads is partitioned by node, as shown in FIG. 6. This ensures that cross-CPU memory borrowing from "thread-private" DBMS caches (during low memory) works within the memory boundaries of a single node.

The conventional API provided by 'libnuma' to allocate memory on a NUMA node is numa_alloc_on_node(<size>, <node>). This routine uses the "BIND" NUMA Policy and the 'mbind' system call, which implements a strict binding guarantee. This strategy ensures the user-requested policy is always respected by the operating system. However, in the case of a low memory or out-of-memory situation on the requested node, usage of this libnuma API may result in the Linux kernel triggering a heavy swapping of memory pages to disk. Occasionally, the Linux "OOM killer" daemon causes the allocating process to be considered as "OOM victim" and kills the process (which in this case is the DBMS). Some embodiments address these shortcomings by using the "PREFERRED" NUMA Policy to implement the NUMA-aware allocations with node-level binding by client threads (i.e. ALLOC_ON_NUMA_NODE(<N>)).

Figure 7:
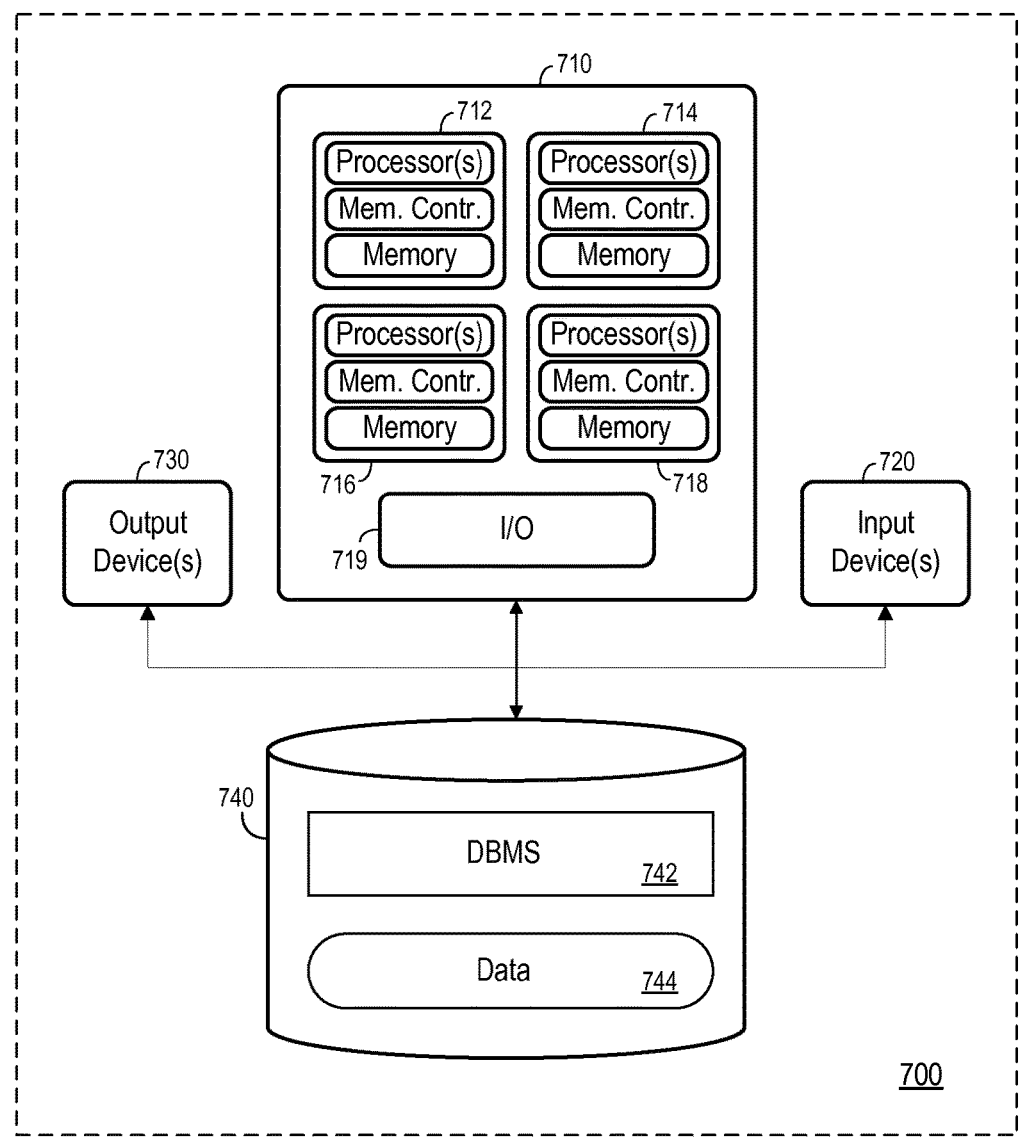
FIG. 7 is a block diagram of a computing apparatus according to some embodiments.

FIG. 7 is a block diagram of system 700 according to some embodiments. System 700 may comprise a general-purpose computing system and may execute program code to perform any of the processes described herein. System 700 may comprise an implementation of database system 110 according to some embodiments. System 700 may include other unshown elements according to some embodiments.

System 700 includes processing unit 710 operatively coupled to one or more input devices 720, one or more output devices 730, and data storage device 740. Processing unit 710 includes four nodes 712 through 718, but embodiments are not limited thereto. Processing unit 710 also includes I/O device to facilitate communication with other elements of system 700.

Input device(s) 720 may comprise, for example, a keyboard, a keypad, a mouse or other pointing device, a microphone, knob or a switch, an infra-red (IR) port, a docking station, and/or a touch screen. Input device(s) 720 may be used, for example, to enter information into system 700. Output device(s) 730 may comprise, for example, a display (e.g., a display screen) a speaker, and/or a printer.

Data storage device 740 may comprise any appropriate persistent storage device, including combinations of magnetic storage devices (e.g., magnetic tape, hard disk drives and flash memory), optical storage devices, Read Only Memory (ROM) devices, Non-Volatile Random Access Memory, or the like Database management system 742 may comprise program code executed by processing unit 710 to cause system 700 to perform any one or more of the processes described herein. For example, database management system 742 may include program code to support the allocation of memory as described above. Data 744 may comprise persisted database data, including, but not limited to, metadata and operational data. Data storage device 740 may also store other data and program code for providing additional functionality and/or which are necessary for operation of system 700, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of a system according to some embodiments may include one or more processors to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those skilled in the art will recognize other embodiments may be practiced with modifications and alterations to that described above.

What is claimed is:

1. A computing system comprising:
a first node comprising a first processor and a first memory; and
a second node comprising a second processor and a second memory,
wherein a worker thread of the first processor:
calls an allocation application program interface to allocate the first memory; and
calls a first allocator of a first memory manager associated with the first node to allocate a specified size of the first memory, and
wherein the first memory manager:
calls an operating system function to reserve a memory segment of the specified size;
sets a first Non-Uniform Memory Access policy of the first node to preferred;
binds the reserved memory segment to the first node;
sets a second Non-Uniform Memory Access policy of the first node as an automatic fallback policy to the first Non-Uniform Memory Access policy of the first node, the second Non-Uniform Memory Access policy being different from the first Non-Uniform Memory Access policy and being associated with a low memory or out of memory condition for the specified size of the allocated memory on the first node;
adds the memory segment to a global freelist; and
returns, in response to the worker thread's call of the allocation application program interface to allocate the first memory, an address pointer of the reserved memory segment to the worker thread, wherein the global freelist is shared by multiple threads and partitioned based on nodes.

2. A computing system according to claim 1, wherein the memory manager identifies a portion of the reserved memory segment, a size of the identified portion corresponding to the specified size, and
wherein the returned address pointer corresponds to the identified segment.

3. A computing system according to claim 1, wherein a worker thread of the second processor:
calls an allocation application program interface to allocate the second memory; and
calls a second allocator of a second memory manager associated with the second node to allocate a second specified size of the second memory, and
wherein the second memory manager:
calls an operating system function to reserve a second memory segment of the second specified size;
sets a first Non-Uniform Memory Access policy of the second node to preferred;
binds the reserved second memory segment to the second node;
sets a second Non-Uniform Memory Access policy of the second node as an automatic fallback policy to the first Non-Uniform Memory Access policy of the second node, the second Non-Uniform Memory Access policy being different from the first Non-Uniform Memory Access policy and being associated with a low memory or out of memory condition for the specified size of the allocated memory on the second node;
adds the second memory segment to a second global freelist; and
returns, in response to the worker thread's call of the allocation application program interface to allocate the second memory, a second address pointer of the second reserved memory segment to the worker thread of the second processor, wherein the second global freelist is shared by multiple threads and partitioned based on nodes.

4. A computing system according to claim 1, wherein the memory manager identifies a portion of the reserved memory segment, a size of the identified portion corresponding to the specified size, and
wherein the returned address pointer corresponds to the identified segment.

5. A method executable by a computing device in response to execution of processor-executable program code, the method comprising:
executing a worker thread of a first processor of a first node to:
call an allocation application program interface to allocate a first memory of the first node, and
call a first allocator of a first memory manager associated with the first node to allocate a specified size of the first memory, and
executing a first memory manager to:
call an operating system function to reserve a memory segment of the specified size;
set a first Non-Uniform Memory Access policy of the first node to preferred;
bind the reserved memory segment to the first node;
set a second Non-Uniform Memory Access policy of the first node as an automatic fallback policy to the first Non-Uniform Memory Access policy of the first node, the second Non-Uniform Memory Access policy being different from the first Non-Uniform Memory Access policy and being associated with a low memory or out of memory condition for the specified size of the allocated memory on the first node
add the memory segment to a global freelist; and
return, in response to the worker thread's call of the allocation application program interface to allocate the first memory, an address pointer of the reserved memory segment to the worker thread, wherein the global freelist is shared by multiple threads and partitioned based on nodes.

6. A method according to claim 5, wherein the memory manager identifies a portion of the reserved memory segment, a size of the identified portion corresponding to the specified size, and
wherein the returned address pointer corresponds to the identified segment.

7. A method according to claim 5, further comprising executing a worker thread of a second processor of a second node to:
call an allocation application program interface to allocate a second memory of the second node; and
call a second allocator of a second memory manager associated with the second node to allocate a second specified size of the second memory, and
wherein the second memory manager is executed to:
call an operating system function to reserve a second memory segment of the second specified size;
set a first Non-Uniform Memory Access policy of the second node to preferred;

bind the reserved second memory segment to the second node;

set a second Non-Uniform Memory Access policy of the second node as an automatic fallback policy to the first Non-Uniform Memory Access policy of the second node, the second Non-Uniform Memory Access policy being different from the first Non-Uniform Memory Access policy and being associated with a low memory or out of memory condition for the specified size of the allocated memory on the second node;

add the second memory segment to a second global freelist; and return, in response to the worker thread's call of the allocation application program interface to allocate the second memory, a second address pointer of the second reserved memory segment to the worker thread of the second processor, wherein the second global freelist is shared by multiple threads and partitioned based on nodes.

8. A method according to claim 5, wherein the memory manager identifies a portion of the reserved memory segment, a size of the identified portion corresponding to the specified size, and wherein the returned address pointer corresponds to the identified segment.

9. A non-transitory computer-readable medium storing program code, the program code executable by a computing system to cause the computing system to:

execute a worker thread of a first processor of a first node to:

call an allocation API to allocate a first memory of the first node, and call a first allocator of a first memory manager associated with the first node to allocate a specified size of the first memory, and execute a first memory manager to:

call an operating system function to reserve a memory segment of the specified size;

set a first Non-Uniform Memory Access policy of the first node to preferred;

bind the reserved memory segment to the first node;

set a second Non-Uniform Memory Access policy of the second node as an automatic fallback policy to the first Non-Uniform Memory Access policy of the second node, the second Non-Uniform Memory Access policy being different from the first Non-Uniform Memory Access policy and being associated with a low memory or out of memory condition for the specified size of the allocated memory on the second node;

add the memory segment to a global freelist; and return, in response to the worker thread's call of the allocation application program interface to allocate the first memory, an address pointer of the reserved memory segment to the worker thread, wherein the global freelist is shared by multiple threads and partitioned based on nodes.

10. A non-transitory computer-readable medium according to claim 9, wherein the memory manager identifies a portion of the reserved memory segment, a size of the identified portion corresponding to the specified size, and wherein the returned address pointer corresponds to the identified segment.

11. A non-transitory computer-readable medium according to claim 9, further comprising executing a worker thread of a second processor of a second node to:

call an allocation application program interface to allocate a second memory of the second node; and call a second allocator of a second memory manager associated with the second node to allocate a second specified size of the second memory, and wherein the second memory manager is executed to:

call an operating system function to reserve a second memory segment of the second specified size;

set a first Non-Uniform Memory Access policy of the second node to preferred;

bind the reserved second memory segment to the second node;

set a second Non-Uniform Memory Access policy of the second node as an automatic fallback policy to the first Non-Uniform Memory Access policy of the second node, the second Non-Uniform Memory Access policy being different from the first Non-Uniform Memory Access policy and being associated with a low memory or out of memory condition for the specified size of the allocated memory on the second node;

add the second memory segment to a second global freelist; and return, in response to the worker thread's call of the allocation application program interface to allocate the second memory, a second address pointer of the second reserved memory segment to the worker thread of the second processor, wherein the second global freelist is shared by multiple threads and partitioned based on nodes.

12. A non-transitory computer-readable medium according to claim 9, wherein the memory manager identifies a portion of the reserved memory segment, a size of the identified portion corresponding to the specified size, and wherein the returned address pointer corresponds to the identified segment.

* * * * *